United States Patent [19]

Fox

[11] Patent Number: 5,138,637
[45] Date of Patent: Aug. 11, 1992

[54] FIRST-IN-FIRST-OUT BUFFER

[75] Inventor: Trevor R. Fox, Lowton, United Kingdom

[73] Assignee: International Computers Limited, London, England

[21] Appl. No.: 760,147

[22] Filed: Sep. 16, 1991

[30] Foreign Application Priority Data

Nov. 6, 1990 [GB] United Kingdom ............. 9024084.7

[51] Int. Cl.$^5$ ............................................. H04L 7/00
[52] U.S. Cl. .................................... 375/118; 370/108
[58] Field of Search .................... 375/106, 110, 118; 370/102, 108, 105.1; 365/230.05, 230.08

[56] References Cited

U.S. PATENT DOCUMENTS

| 4,433,394 | 2/1984 | Torii et al. | 375/118 |
| 4,839,893 | 6/1989 | Smith | 375/118 |
| 4,884,286 | 11/1989 | Szcdzepanek et al. | 370/102 |
| 4,891,788 | 1/1990 | Kreifels | 375/118 |
| 4,965,794 | 10/1990 | Smith | 370/105.1 |
| 5,020,081 | 5/1991 | Allen et al. | 375/118 |
| 5,033,064 | 7/1991 | Upp | 375/118 |

Primary Examiner—Stephen Chin
Attorney, Agent, or Firm—Lee, Mann, Smith, McWilliams, Sweeney & Ohlson

[57] ABSTRACT

A first-in-first-out buffer is described for transferring data between two asynchronous clock regimes. The buffer comprises a first register file, for transferring data from the slow to the fast clock regime, and a second register file for transferring data in the opposite direction. The write addresses for the first register file are produced by a counter in the slow clock regime, and converted back to standard binary, and a predetermined offset is added to the result, so as to produce a read address for the first register file. This is also used as the write address for the second register file. The read address for the second register file is produced by adding a predetermined offset to the output of the counter. Thus, the read and write addresses of the two register files are always in a fixed relationship, so that it is not necessary to provide special logic for detecting the buffer full and buffer empty conditions.

8 Claims, 1 Drawing Sheet

FIRST-IN-FIRST-OUT BUFFER

BACKGROUND OF THE INVENTION

This invention relates to first-in-first-out (FIFO) buffers.

In digital systems, it is sometimes required to transfer data between two asynchronous clock regimes; that is, between first and second groups of logic where the first group is controlled by a first clock signal and the second group is controlled by a second clock signal which is not synchronised with the first clock signal.

In such a system, if no special precautions are taken, there is a possibility that the output data from the first clock regime may change at approximately the same time as it is transferred into the second clock regime. Because of variations in tolerances, the individual bits of a data word transferred in parallel between the first and second clock regimes may come from different clock beats of the first clock regime, resulting in corruption of the data.

A known solution to this problem is to use a FIFO memory to buffer data between the two clock regimes.

One known FIFO memory comprises a plurality of storage locations for storing a plurality of data words. The FIFO is addressed by separate read and write counters, which cause words to be written cyclically into the storage locations and then to be read out in the same cyclic order. However, a problem with this arrangement is that it requires special logic for detecting the buffer full and buffer empty conditions, and for preventing further input or output in these conditions.

The object of the present invention is to provide an improved FIFO buffer for transferring data between two clock regimes, which does not require any such buffer full and buffer empty logic.

SUMMARY OF THE INVENTION

According to a first aspect of the invention there is provided a first-in-first-out buffer for transferring data from a first clock regime to a second, asynchronous clock regime, the buffer comprising:
 a) a plurality of data storage locations,
 b) a write counter, synchronised to the first clock regime, for producing a first address, the first address being used to select one of the storage locations to receive data from the first clock regime, and
 c) means for deriving a second address from the first address, and for using the second address to select one of the storage locations to supply data to the second clock regime.

It can be seen that, with the invention, a single counter controls both writing to and reading from the FIFO, so that the read address is in a predetermined relationship to the write address. Hence, no read counter is required, and no special logic is required for detecting the buffer full and buffer empty conditions.

According to a second aspect of the invention, there is provided a first-in-first-out buffer for transferring data between a first clock regime and a second, asynchronous clock regime, the buffer comprising:
 a) first and second register files, each of which comprises a plurality of data storage locations,
 b) a write counter, synchronised to the first clock regime, for producing a first address, the first address being used to select one of the storage locations in the first register file to receive data from the first clock regime,
 c) means for deriving a second address from the first address, the second address being used to select one of the storage locations in the first register file to supply data to the second clock regime, and to select one of the storage locations in the second register file to receive data from the second clock regime, and
 d) means for deriving a third address from the first address, the third address being used to select one of the storage locations in the second register file to supply data to the first clock regime.

DESCRIPTION OF AN EMBODIMENT OF THE INVENTION

One FIFO buffer in accordance with the invention will now be described by way of example with reference to the accompanying drawings.

Figure 1:
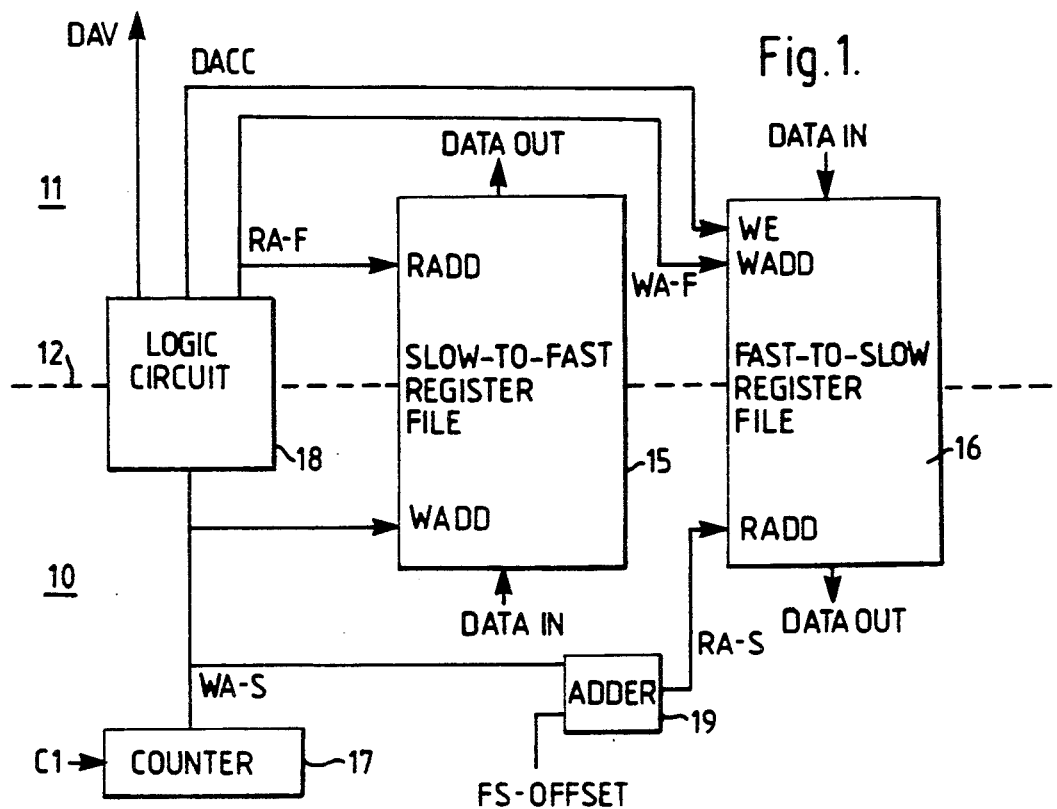
FIG. 1 is a block diagram of a FIFO buffer.

Referring to FIG. 1, the FIFO buffer provides a two-way interface between a slow clock regime 10 (with clock signal Cl) and a fast clock regime 11 (clock signal C2). The boundary between the two clock regimes is indicated by the dotted line 12.

The buffer comprises two register files: a slow-to-fast register file 15 and a fast-to-slow register file 16. Each of these register files contains eight individually addressable storage locations, each of which holds one word of data. Each register file has separate read address (RADD) and write address (WADD) inputs which allows data to be written and read simultaneously from different locations in the same register file. The write address input WADD of the slow-to-fast register file 15 received a 3-bit address signal WA-S from a counter 17. This counter is incremented at each beat of the slow clock signal Cl, and produces a cyclic sequence of addresses, causing each location of the register file 15 to be addressed in turn in a cyclic sequence. Thus, successive input data words from the slow clock regime are written into a successive locations of the register file 15 in a fixed cyclic order.

The output WA -S from the counter 17 is also fed to a logic circuit 18, which resynchronises this signal to the fast clock regime, to produce a read address signal RA-F. This signal RA-F is applied to the read address input RADD of the slow-to fast register file 15, so as to control the reading of data from this register file into the fast clock regime. The signal RA-F is also applied, as a write address signal WA-F, to the write address input WADD of the fast-to slow register file 16, so as to control writing of data from the fast clock regime into that register file. Thus, it can be seen that whenever one location of the register file 15 is addressed for reading, the correspondingly numbered location of the register file 16 is addressed for writing.

The logic circuit 18 also produces a data available signal DAV which indicates that a data word is available from the output of the slow-to-fast register file 15. At the same time, the logic circuit 18 produces a data accept signal DACC which is applied to the write enable input WE of the fast-to-slow register file 16, causing a data word to be written from the fast clock regime into the currently addressed location of the register file 16.

The signal WA -S from the counter 17 is also added to a predetermined offset value FS-OFFSET in an adder 19, to form a read address RA-S. This read address is fed to the read address input RADD of the fast-to-slow register file 16, so as to control the reading of data from this register file into the slow clock regime. Thus, it can be seen that reading from the register file 16 is performed in step with writing to the register file 15, at a location displaced by a predetermined offset.

Figure 2:
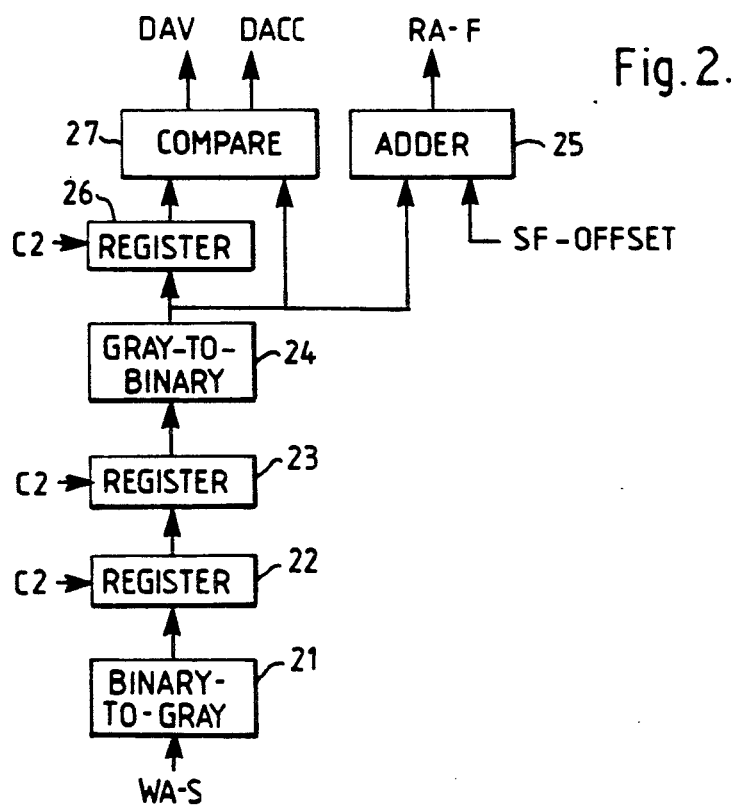
FIG. 2 shows an address generation circuit in more detail.

Referring now to FIG. 2, this shows the logic circuit 18 in more detail.

The input signal WA-S from the counter 17 is applied to a binary-to-Gray code conversion circuit 21, which converts the standard binary count sequence from the counter into a Gray code sequence. By a Gray code sequence is meant one in which, at each successive step, only one bit at a time changes.

Thus, in the present example, the 3-bit count is converted into a 3-bit Gray code as follows:

| Count | Gray Code |
|-------|-----------|
| 000   | 000       |
| 001   | 001       |
| 010   | 011       |
| 011   | 010       |
| 100   | 110       |
| 101   | 111       |
| 110   | 101       |
| 111   | 100       |

The output of the conversion circuit 21 is clocked into a register 22 by the fast clock signal C2. The output of this register 22 is in turn, clocked into a second register 23, at the next beat of the fast clock signal C2. These two registers provide a "de-dithering" effect; that is, they remove any uncertainty in the states of the signals which might arise if the input signal WA-S were to change at approximately the same time as the clock signal C2.

The output of the second register 23 is fed to a Gray-to-binary code conversion circuit 24, which converts the signal back to standard binary form.

The purpose of converting the address signal WA-S to Gray code at the point where it crosses the boundary between the two clock regimes is to avoid the possibility of corruption of the signal if the signal changes at approximately the same time as the clock C2. If the signal were in standard binary code at this point, a transition from, say, 001 to 010 at approximately the same time as the clock beat C2 might result in any of the following values being clocked into the register 22, depending on the tolerances of the circuits:
001
000
011
010

Of these, the first and last are acceptable, since they represent the values of the signal before and after the transition. However, the other two values are unacceptable, and represent a corruption of the data. On the other hand, when a Gray code is used, this corruption cannot occur. For example, a transition from 001 to 011 at approximately the same time as the clock beat C2 can lead to only one of the values 001 or 011 being clocked into the register 22, both of which are acceptable.

The output of the code conversion circuit 24 is added to a predetermined offset value SF-OFFSET in an adder 25, to produce the address signal RA-F.

It can be seen that the output of the circuit 24 (and hence the signal RA-F) is a conventional binary count sequence, except that some of the counts are repeated in successive beats of clock C2. This is because there are more fast clock beats (C2) than slow clock beats (C1). The occurrence of these repeated counts is detected as follows:

The output of the circuit 24 is clocked into a register 26 by the clock C2. The outputs of the circuit 24 and the register 26 are then compared, in a comparator 27, which produces output signals DAV and DACC. In other words, the comparator 27 compares the current value with the previous value. If they are not equal, then both DAV and DACC are true; otherwise, they are false.

As mentioned above, the signal DAV indicates that a new data word is available from the slow-to-fast register file 15, and it can be seen that this signal DAV goes true only when the read address RA-F changes. Similarly, the signal DACC indicates that a new word is to be written into the fast-to-slow register file 16, and it can be seen that this signal DACC goes true only when the write address WA-F changes.

In summary, it can be seen that, in the buffer arrangement described above, the read and write addresses for both the register files are derived from the same counter, and hence are always in fixed predetermined relationship to each other. Hence, it is not necessary to provide any special logic for detecting buffer full and buffer empty conditions.

The offset values FS-OFFSET and SF-OFFSET can be chosen so as to minimise the delays through the buffer. The optimum offset values will be determined by the ratio of the clock frequencies in the two regimes, and by the component tolerances.

It has been found that the buffer can cope with wide variations in the clock frequency ratio. Moreover, the logic for addressing the register files does not have to be initialised: any illegal states occurring when power is first applied will disappear after an initial period.

It will be appreciated that various modifications can be made to the system described above without departing from the scope of the present invention. For example, the register files could be addressed by a Gray code sequence, instead of by a conventional binary sequence. This would remove the need for a Gray-to-binary code conversion circuit 24, although it would introduce extra complication in the adder 25 for calculating the address signal RA-F, since this would have to perform addition of Gray-encoded values.

Although the embodiment described above is a two-way buffer, it will be appreciated that the invention is also applicable to a one-way buffer arrangement, where data flows from a first clock regime to a second clock regime, but does not return in the opposite direction.

I claim:

1. A first-in-first out buffer for transferring data from a first clock regime to a second, asynchronous clock regime, the buffer comprising:
   a) a plurality of data storage locations,
   b) a write counter, synchronised to the first clock regime, for producing a first address, the first address being used to select one of the storage of locations to receive data from the first clock regime, and c) means for deriving a second address from the first address, and for using the second address to select one of the storage locations to supply data to the second clock regime.

2. A first-in-first-out buffer for transferring data between a first clock regime and a second, asynchronous clock regime, the buffer comprising:
   a) first and second register files, each of which comprises a plurality of data storage locations,
   b) a write counter, synchronised to the first clock regime, for producing a first address, the first address being used to select one of the storage locations in the first register file to receive data from the first clock regime,
   c) means for deriving a second address from the first address, the second address being used to select one of the storage locations in the first register file to supply data to the second clock regime, and to select one of the storage locations in the second register file to receive data from the second clock regime, and
   d) means for deriving a third address from the first address, the third address being used to select one of the storage locations in the second register file to supply data to the first clock regime.

3. A buffer according to Claim 1 wherein the means for deriving the second address from the first address comprises means for encoding the first address in a Gray code, means for resynchronising said Gray code to the second clock regime, and means for decoding the resynchronised Gray code back into a conventional binary code.

4. A buffer according to Claim 3 further including means for comparing said second address, at each clock beat of the second clock regime, with the value of said second address in the previous clock beat of the second clock regime, and for producing a data available signal when said values are different.

5. A buffer according to claim 2 wherein the means for deriving the second address from the first address comprises means for encoding the first address in a Gray code, means for resynchronising said Gray code to the second clock regime, and means for decoding the resynchronised Gray code back into a conventional binary code.

6. A buffer according to claim 1 wherein the means for deriving the second address comprises an adder for adding a predetermined offset value.

7. A buffer according to claim 2, wherein said means for deriving the third address comprises an adder for adding a predetermined offset value to said first address.

8. A buffer according to claim 5, including means for producing a write enable signal for the second register file whenever the data enable signal is true.

* * * * *